United States Patent Office 3,179,808
Patented Apr. 20, 1965

3,179,808
PHOTOSENSITIVE TRANSDUCER HAVING PRE-
DETERMINED OUTPUT RESPONSE
David S. Grey, Lexington, and Peter H. Mark, Arlington,
Mass., assignors to Polaroid Corporation, Cambridge,
Mass., a corporation of Delaware
Filed Aug. 27, 1959, Ser. No. 836,494
15 Claims. (Cl. 250—209)

This invention relates to transducer devices and more particularly to a novel arrangement of transducer means for providing an electrical output signal which is a predetermined function of an extended range of input signals.

In its broadest aspects, this invention is concerned with a device for maintaining a limited range of response of transducing means over a substantially increased range of input signals. More particularly, the invention concerns such a device wherein the response is substantially a linear function of the logarithm of the input signal. The desirability of providing a simple and compact device for extending the range of input signals to which a predeterminedly limited, scaled, measurable or otherwise employable transducer response may be obtained is readily apparent.

It is therefore a principal object of this invention to provide a novel transducing device for producing a limited range of electrical output signals which represent a substantially linear function of the logarithm of an extreme range of input signals.

Other objects of this invention are to provide a transducing device comprising a plurality of transducer portions and having a total electrical output which is a logarithmic function of an input over a substantially greater range of input intensities than the maximum intensity range to which any one of the portions can alone provide a logarithmic output; to provide such a transducing device wherein each of said transducing portions is primarily responsive to a different limited increment of the range of said input than the others of said transducing portions; and to provide such a transducing device wherein each of said transducing portions is radiation sensitive.

Other objects of this invention are to provide a radiation-responsive device comprising a plurality of radiation-sensitive portions exposable to a common radiation source together with means for attenuating the intensity of radiation incident upon at least one of said portions, said portions being so disposed in circuit relation to one another that variations in the total circuit response at (1) high intensities of incident radiation are primarily determined by the behavior of said one of said portions and (2) variations in said response at a low intensity of incident radiation are primarily determined by the behaviors of the others of the portions; to provide a radiation-responsive device comprising at least two radiation-sensitive portions, at least one attenuating means so disposed with respect to at least one of said radiation-sensitive portions as to so reduce the intensity of radiation incident upon said one portion that it bears a predetermined fractional relation to the intensity of radiation incident upon the other of said portions, and means providing a network such that each of said portions is in parallel circuit relation to one another and in series circuit relation with at least an electrically resistive element, each of said portions having an electrical resistance which varies approximately as an inverse power function of radiation incident thereon; to provide such a radiation-responsive device including electromagnetic means coupled with said network and having a portion thereof responsive to changes in the total conductance of said network responsively to variations in the intensity of common radiation incident upon said elements; and to provide such a radiation-responsive device wherein said means provide a network wherein each of said portions is in series circuit relation to one another and in parallel circuit relation with an associated electrical resistor, and said portion of said electromagnetic means is responsive to changes in the total resistance of said network.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
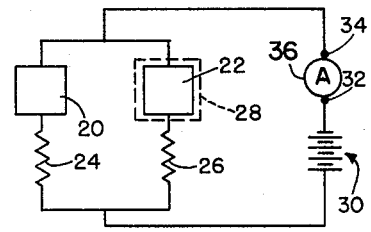
FIGURE 1 is a schematic diagram of one embodiment of the invention.

In a transducing means network having a resistive impedance whose electrical conductance changes, when subject to an input signal, approximately as an inverse power function of the intensity of said signal, it is particularly desirable that the transducing means may produce a measurable current response which varies "regularly" over a limited range while the input intensity varies over a large range. For instance, in a decibel meter, which incorporates a transducer such as a microphone, it is preferred that the full scale deflection of the meter movement be adequate to represent an extremely large range of audio intensities without changes in the scale of the meter and without substantial complications of the electrical circuitry. A similar preference extends to other fields such as the art of radiation detection wherein transducing means such as photoconductive devices are employed. The term "photoconductive," is used herein, is intended to indicate a resistive impedance whose electrical resistance changes when subject to irradiation as an approximately inverse power function of the intensity of radiation over a predetermined radiation-frequency range, for example, visible light, ultraviolet and infrared radiation, or when subjected to a variety of corpuscular radiation, as for instance, $\alpha$, $\beta$, $\gamma$, and X-radiation.

For example, in the photographic arts, it has been observed that photometers employing photoconductors as a light-sensitive element have been limited by the narrow range of radiation intensity to which a logarithmic-linear response may be obtained. On the other hand, the speed of emulsions has been so extended as to permit recording of satisfactory photographic images under extreme conditions of intensities of actinic radiation. Where it has been necessary that a photometer be responsive in a substantially matched manner to the density-log exposure curve of such emulsions, it has hitherto been necessary to provide complex mechanical or electrical devices and methods for shifting the range of response of the photometer to cover those extreme conditions while approximately matching the full range of the contour of the density-log exposure curve.

Many photoconductors are characterized in that their electrical resistance varies inversely with a power of the intensity of radiation to which they are exposed. By placing such a photoconductor in series with an electrically resistive element of substantially constant value, one obtains a combination, the conductance of which varies substantially linearly with the logarithm of the intensity of incident radiation. This linear variation generally covers a range in the nature of from approximately 2 to 4 orders of magnitude of radiant intensity. Where such a photoconductor is placed in parallel with an electrically resistive element, one obtains a combination, the resistance of which varies substantially linearly with the logarithm of the intensity of incident radiation. These combinations may themselves be placed in additional combinations as taught hereinafter. A number of photoconductive materials are known in the art, representative examples being silicon, selenium, and the sulfides of zinc, lead, thallium and cadmium. For instance, cadmium sulfide is known to respond in such manner to the radiations heretofore mentioned, the sensitivity of such response being such that, for example, in a single cadmium sulfide crystal, one α particle can induce a secondary change transport of about $10^{10}$ or more electrons when the contacts are ohmic.

The present invention generally comprises a device capable, upon exposure to an input signal, as for instance, radiation, strains, sound and the like, of yielding an output signal which is a log-linear function of the intensity of said input. This device preferably comprises a plurality of transducer portions disposed in a predetermined electrical circuit relationship to one another, each of said portions having an electrically resistive impedance which varies as an approximately inverse power function of the intensity of the input signal to which said portion may be responsive. One of the transducer portions has an effective responsivity which is substantially unequal to the other portions. As a means for rendering output signals provided by said portions as logarithmic functions of input intensity, each of said transducer portions is in predetermined circuit relation with at least an electrically resistive element which preferably has a substantially constant value. The contacts of the circuit are preferably ohmic in nature inasmuch as non-ohmic contacts require substantially higher voltages for driving the transducer portion, in order, for instance, to break down any interelectrode capacitance.

Referring now to the drawings, there is shown in FIGURE 1 a schematic view of one embodiment of the present invention which comprises two transducer means such as photoconductive element 20 and photoconductive element 22 which are coupled in parallel circuit relation with one another and so disposed adjacent one another as to present their photosensitive surfaces substantially equally within the path of common, incident radiation to which they are responsive. Disposed in series relationship with elements 20 and 22, respectively, are electrically resistive members such as resistors 24 and 26 of relatively fixed ohmic values. One of the photoconductive elements, for instance, 22, has associated therewith (as indicated in broken lines) a radiation-transmitting and absorbing element such as a neutral density radiation filter 28 which is disposed to predeterminedly limit the intensity of radiation incident upon element 22.

As a means for energizing the circuit of FIGURE 1, there is provided an electrical power source, such as battery 30, which is preferably disposed in series with the parallel network provided by elements 20 and 22 and resistors 24 and 26. This power source may of course take other forms, examples being a conventional A.-C. rectifier, a photovoltaic and a thermoelectric element. Upon exposure of elements 20 and 22 to radiation, preferably from a single common source, the current output response of the circuit may be tapped or measured at terminals 32 and 34 provided in series with battery 30. For the circuit shown, an appropriate conductance measuring device, such as ammeter 36, is provided for measuring the current at terminals 32 and 34. Suitable electrically conductive means are, of course, provided for connecting the elements in the specified circuit relationships.

In operation, when exposed to a common actinic radiation signal, the electrical resistance of each of elements 20 and 22 will vary inversely in accordance with the intensity of radiation incident thereon. The ohmic resistance, P, of element 20 may be generally expressed as $$(1) \qquad P = \frac{K_1}{I^{n_1}}$$

where $K_1$ is a proportionately constant known generally as the reciprocal of the "responsivity" of element 20.

I is the intensity of radiation incident upon element 20, and $n_1$ is a function of physical characteristics of element 20 having a value which lies between 0.5 and 1.0 for most photoconductors.

A similar expression may be employed to generally describe the behavior of element 22 by substituting $K_2$ for $K_1$ and $n_2$ for $n_1$ in Equation 1, where $K_2$ is the reciprocal of the "responsivity" of element 22, and $n_2$ is a function of element 22 similar to $n_1$ in nature.

In terms of conductance (reciprocal ohms), the current provided by battery 30, passing through the network and as measured at terminals 32 and 34, may be given as approximately $$(2) \qquad \frac{1}{R} = \frac{I^{n_1}}{K_1 + I^{n_1} B_1} + \frac{I^{n_2}}{K_2 + I^{n_2} B_2}$$

wherein $K_1$, $K_2$, I, $n_1$, and $n_2$ are as hereinbefore defined, $B_1$ is the value in ohms of resistor 24, and $B_2$ is the resistance of resistor 26, $B_1$ preferably being approximately equal to $B_2$.

For establishing the ratio of the responsivities $(K_2/K_1)$ as other than unity, means may be provided in several alternative forms. For instance, materials having different responsivities may be employed for constructing element 22 and element 24. Also, the same material may be employed for constructing each element, one element being provided, however, with a substantially smaller photosensitive surface than the other; or substantially identical elements may be employed together with means for attenuating that portion of the common input signal incident upon only one of the elements. In this latter instance, the term "effective responsivity" is employed herein to describe the total responsivity or K value of the combination of an element and its attenuator. In the preferred embodiment, each of the photoconductive elements has substantially identical inherent responsivities and the ratio $(K_2/K_1)$ is adjusted by employment of an attenuation means such as filter 28 heretofore described in connection with element 22. Other means may be provided for so attenuating or limiting the radiation incident upon element 22, as for instance, color filters or baffles.

Now, by setting the value of filter 28, for instance, at 2 when using substantially identical photoconductive elements [such filter transmitting $1/100$ of the intensity of radiation incident thereon] the ratio $K_2/K_1$ is made equal to $10^{2n}$. And by setting the ohmic value of resistive members 24 and 26 substantially equal to one another, it will be seen that at low intensities of common incident radiation upon the photoconductive elements, the arm of the circuit containing element 20 determines the response of the circuit and the resistance of element 22 acts as a constant shunt. At higher intensities, the resistance of element 20 becomes less than the resistance of its associated resistor 24, and element 22 now determines the response of the circuit. The influence of the arm of the circuit containing element 20 is minor in this latter intensity range, its current limiting action being unnecessary since element 20 begins to take over as the intensity is again dropped. Consequently, the range of intensities, to which a log intensity current response relationship is nearly linear, is therefore approximately double the approximate range provided by a single photoconductive element similar to either element 20 or 22. The output response in terms of conductance is thereby a substantially linear function of a greatly extended range of input intensities.

Since the response of a photoconductor to hard radiation and to particle radiation can be expressed in terms of corresponding resistance changes, the circuit heretofore described can also be used to form a logarithmic particle-radiation meter. The filter or attenuator must, of course, be appropriate to the type of radiation being measured, and the photoconductors must also be suitably shielded against stray radiation.

Typical examples of commercially available photoconductive elements which may be used with the circuit of FIGURE 1 include the RCA–6957 photocell and the CL–407 photocell manufactured, respectively, by the Radio Corporation of America and the Clairex Corporation. For both of these photocells, a value of K approximately equal to $10^4$ (the intensity being measured in foot candles and the resistance in ohms) was found to be characteristic over an appreciable intensity range.

Two Clairex CL–407 cells were employed in the circuit of FIGURE 1 as elements 20 and 22, the cells being disposed closely adjacent one another with their photosensitive surfaces disposed in approximately the same direction. A radiation source was employed and so calibrated that the maximum intensity was adjusted to $10^3$ foot candles. The intensity of the light incident on the cells was then decreased by stages to $10^{-2}$ foot candles. By setting circuit constants such that the value of resistors 24 and 26 was substantially $10^5$ ohms, filter 28 was a neutral density 2.9 and the voltage of battery 30 was 16 volts, the current vs. log intensity relation obtained was that appearing as curve A in FIG. 2

The circuit shown in FIGURE 1 was also constructed wherein two RCA–6957 photocells were employed as elements 20 and 22, and irradiated similarly to the Clairex CL–407 cells. The circuit constants employed therewith were such that the values of resistors 24 and 26 were both substantially $10^5$ ohms, filter 28 was a neutral density 3, and the driving voltage of battery 30 was again 16 volts. The current in microamperes vs. the logarithm of the intensity in foot candles produced a curved denoted B in FIG. 2.

Another network was constructed using two Clairex CL–407S cadmium sulfide cells as elements 20 and 22, and irradiated similarly to the previous examples. Resistors 24 and 26 were provided with values of approximately $6 \times 10^3$ ohms each, filter 28 was a Wratten ND 3.0 placed over cell 22, battery 30 was a Mallory "button" battery of 1.34 volts, and meter 32 was a miniature linear microammeter. The response obtained is shown graphically as curve C in FIG. 2.

Figure 2:
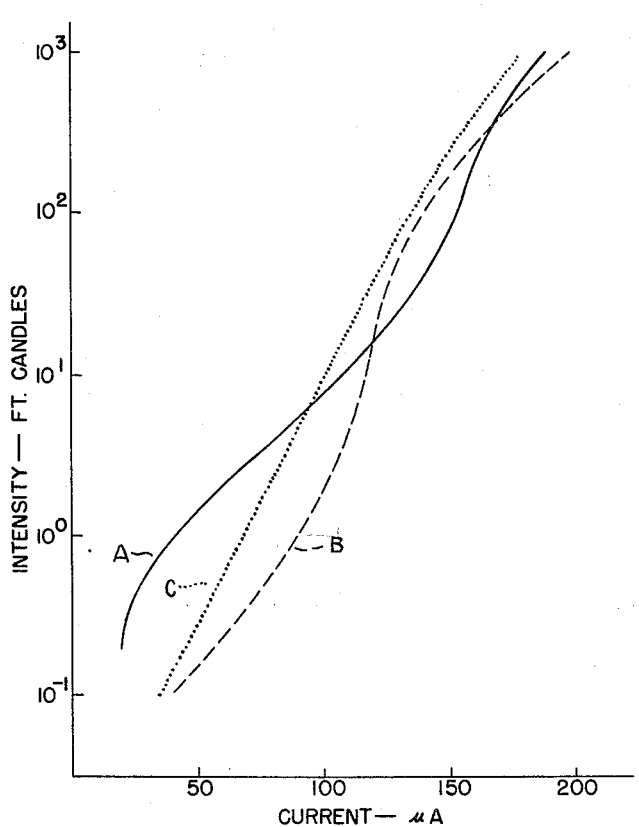
FIG. 2 is a semi-logarithmic graphical representation of the operation of particular embodiments of the invention.

It is apparent from examination of the curves of FIG. 2 that the current varies approximately linearly with the log intensity over approximately four orders of magnitude in both curves and that the extension of one order of magnitude to higher and lower intensities causes deviations which do not substantially depart from the desired logarithmic characteristics. From commercially available data, it is to be noted that the linear characteristics of the curves are at least approximately double the number of orders of magnitude of the linear characteristics obtainable by employing the commercial cells singly with an associated resistor, the RCA cell having a normal linear range of approximately two orders of magnitude and the Clairex cells having a normal linear range of approximately 2.5 orders of magnitude. Curve C is a particularly good example of the linearity of total response obtainable over more than four decades of intensity.

In alternative embodiments employing the commercial cells heretofore mentioned, by providing a filter 28 with a neutral density 2, the total range of linear response is diminished from that shown in FIG. 2 by approximately one order of magnitude. Similarly, by increasing the value of filter 28 to 4, the range of response is increased by approximately one order of magnitude over that shown in curves A and B, but the curve then will comprise two distinct linear regions. By increasing the ohmic value of resistors 24 and 26, the linear range of the current vs. log intensity curve is shifted toward the lower intensities but with an accompanying reduction in the output current. It is therefore apparent that the behavior of the circuit of FIGURE 1 is strongly influenced by the values chosen for the resistors 24 and 26, the sensitivity of the respective photoconducting elements 20 and 22, and the ratio of the light intensity incident on the two photoconducting elements. The circuit values leading to curves A and B are preferred for obtaining substantial linear compaction of the output current over a range of incident radiation intensities which is substantially in excess of the range of intensities to which either one of the photoconductive elements is individually logarithmically responsive.

Similar results may be obtained in devices wherein there are a plurality consisting of more than two transducers in parallel in the circuit. Each of the transducers essentially adds one unit of current to the total output of the circuit logarithmically over an interval or increment of input intensity. This current unit is approximately equal to the current output of one of the transducers alone over the same interval of intensity, assuming, of course, that the transducers are preferably all substantially the same in their inherent responsivity.

Figure 5:
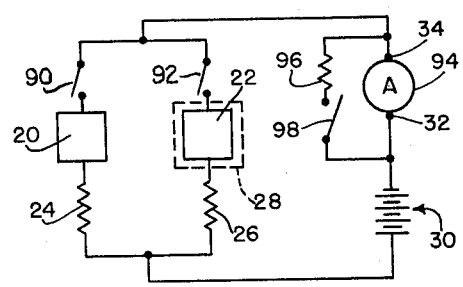
FIG. 5 is a schematic diagram of a modification of the embodiment of FIG. 1.

Another embodiment of the invention is shown in FIG. 5, like numbers being employed to indicate parts similar to those in the embodiments heretofore described and illustrated. The embodiment of FIG. 5 includes first switching means such as switch 90 disposed in series with element 20 and associated series resistor 24, and second switching means such as switch 92 which is similarly disposed in series with element 22 and its associated series resistor 26. Filter 28 is provided for attenuating radiation incident upon element 22 and elements 20 and 22 are in parallel circuit relationship, all as hereinbefore described. This embodiment also includes a measuring device or meter, such as recording microammeter 94, which is disposed in the circuit between terminals 32 and 34, for measuring the current flowing in the network. As a means for increasing the current range to which meter 94 is responsive, there is provided a shunt resistor 96 adapted to be positioned in parallel with meter 94. There is also provided a third switching means such as switch 98 in series with resistor 96 for switching the resistor in and out of circuit with meter 94. Battery 30 is included as a means for providing electrical power to the circuit. It must thus be seen that with the proper choice of resistor values, and by manipulation of the switches, each of elements 20 and 22 can be operated independently over the full range of deflection angles of meter 94. With the inclusion of resistor 96 in circuit, the sensitivity of the exposure meter may be increased substantially (as determined by the value of resistor 96) when the device is operated over the range of incident light intensities spanned by each element itself. When switches 90, 92 and 98 are all closed so that the shunt resistor is switched in and both elements 20 and 22 are included in the network, the full range of deflection angle of the microammeter then covers the entire range of light intensities spanned by both elements. The switches are preferably so arranged and coupled that switch 98 is open whenever either switch 90 or 92 is open, and switch 98 is always closed when switches 90 and 92 are both closed. This may be accomplished by methods well known in the art of gauging the switches. Similar switching arrangements may be incorporated in networks wherein there are more than two transducing elements.

Figure 3:
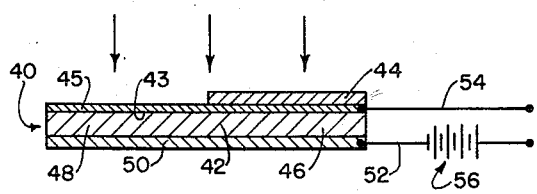
FIG. 3 is a diagrammatic cross-section through a radiation-responsive embodiment of the invention.

Since the series resistive members associated with the transducer elements may be substantially equivalent in value to one another, another embodiment of the invention, as shown in FIG. 3, does not employ separate transducer elements but may be constructed as a unitary device indicated generally by the reference numeral 40. Device 40 is preferably formed as a sandwich comprising a plurality of stacked layers and includes, in the form shown, a radiation-sensitive layer 42 sandwiched between a surface electrode layer 45 and a base electrode layer 50, a portion of layer 45 being sandwiched between layer 42 and a radiation-absorptive-and-transmissive layer 44.

Radiation-sensitive layer 42, in the form shown, includes a substantially planar exterior surface 43 exposed for irradiation, the direction of incident actinic radiation being indicated by arrows. Layer 42 preferably comprises a substance having an electrical conductance which varies approximately as a power function of the intensity of incident actinic radiation and may thus be composed of, for instance, cadmium sulfide in crystalline form. Surface electrode layer 45 preferably has a maximum uniform radiation transmissiveness commensurate with the maintenance of a continuous electrical conductivity throughout and, in the form shown, is disposed as a thin layer of substantially uniform thickness on surface 43. Such a thin layer may be provided, for example, in the form of a vacuum deposit of a metal which makes ohmic contact with layer 42. As a means for limiting the intensity of radiation incident upon a portion of layer 42, to a fractional value of the intensity incident upon the remainder of layer 42, there is provided, in the form shown, layer 44. Layer 44 may comprise, for example, a neutral density filter disposed immediately adjacent surface electrode 45 for intercepting radiation incident upon a portion 46 of layer 42, and is preferably deposited or bonded to electrode 45. Layer 44 may be provided in any of many plane configurations, for instance, it may be disposed as a plurality of discrete strips, checkerboard fashion or as a continuous and variable wedge, and may be constructed of a variety of well-known substances, such as, for example, where the actinic radiation is visible light, glass or light-transmitting polymers. It will be seen that the portions of layer 42 are analogous to elements 22 and 24 of the embodiment of FIGURE 1.

Portion 46 of layer 42 and portion 48 (which is not provided with a radiation limiting layer) are preferably disposed in series relation with at least an electrically resistive element of approximately constant value. In the preferred form, this electrically resistive element comprises base electrode layer 50 which, for instance, may be composed of a sheet of gallium or indium deposited on or bonded to layer 42 on the opposite surface thereof from surface 43. Alternatively, of course, layer 50 may be merely an electrically conductive layer and may be in series with an individual resistor of substantially constant value.

Electrically conductive leads 52 and 54, respectively, are provided at a portion each of base electrode layer 50 and surface electrode 45 as a means for adapting device 40 into a circuit whereby the device may be energized by an electrical power source such as battery 56. The contacts provided by the adjacent relation of all layers and by the leads are all preferably ohmic in nature.

Figure 4:
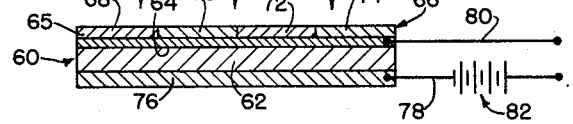
FIG. 4 is a diagrammatic cross-section through yet another embodiment of the invention.

Another embodiment of the invention, as shown in FIG. 4, again comprises a unit transducer, as for instance, photoconductive element 60, which preferably includes a single radiation-sensitive layer 62 which, in the form shown, has a substantially planar exterior surface 64 exposed for irradiation. A surface electrode 65, similar to electrode 45 in the embodiment of FIG. 3, is provided across surface 64. As a means for limiting the intensity of radiation incident upon layer 62, there is provided, for example, an absorptive and transmissive layer 66 disposed immediately adjacent surface 64 and preferably bonded thereto or deposited thereon. Layer 66, for example, includes a plurality of portions thereof, each having predetermined and preferably different absorptive and transmissive characteristics. For instance, in FIG. 4, layer 66 is shown as comprising four discrete portions 68, 70, 72, and 74, each comprising a neutral density filter having, respectively, values of 2, 2.5, 3, and 3.5. Each of the portions of radiation-sensitive layer 62 which underlies the respective portion of layer 66, is disposed in series relation with at least an electrically resistive element, which, in the preferred form, comprises the base electrode 76 to which layer 62 is attached. Leads 78 and 80 are connected, respectively, to an extremity of the base electrode resistance 76 and to the surface electrode 65, as a means for adapting the photoconductive transducer 60 for inclusion in a circuit for energizing the transducer and for measuring or employing the output thereof. The electrical power source for energizing the transducer is provided by battery 82 introduced, for instance, in lead 78. As it is desirable that the contacts between all of the elements are ohmic in nature, the connections between leads 78 and 80 and the respective electrodes are, for instance, provided by silver solder.

In operation, photoconductive transducer 60 functions in essentially the same manner as the device previously disclosed in FIG. 3 and possesses the same advantage of compactness previously disclosed.

The embodiments shown thus far are particularly useful with devices wherein a linear signal input is preferred. For instance, when the embodiment shown in FIGURE 1 is employed in a photometer, the meter which measures the response at terminals 32 and 34 preferably has a "linear" meter movement. However, the embodiments shown may, under certain circumstances, be tailored to match non-linear movements to achieve a "linear" result; for a particular non-linear movement to be employed with these embodiments the meter sensitivity should be proportional to the reciprocal of a function $S(I)$ for the embodiment. For a network of two substantially identical transducer elements or portions, one may express this function as follows:

$$S(I) = N_1 K_1 \left[ \frac{I^{n_1}}{(K_1 + I^{n_1} B_1)^2} \right] + N_2 K_2 \left[ \frac{I^{n_2}}{(K_2 + I^{n_2} B_2)^2} \right]$$

where $B_1$ and $B_2$ are the series resistances of respectively the "ordinary" element and the "attenuated" element, and $n$, $K$, and $I$ are all as previously defined.

If the meter sensitivity decreases with an increase in meter deflection angle, a linear relation between the deflection angle and the logarithm of the light intensity may be established by choosing $B_2$ as smaller than $B_1$. This is so because at low light levels, where the "ordinary" element determines the conductance change of the circuit, such a non-linear meter would be operating in its most sensitive range. At higher intensities, when the "ordinary" element becomes strongly conducting (so that its resistance is less than or equal to $B_1$), choosing $B_2$ less than $B_1$ would tend to compensate for the non-linearity of the meter. Conversely, in cases where the meter sensitivity increases with deflection angle increase, linear compensation may be attained by choosing $B_2$ as greater than $B_1$.

Figure 6:
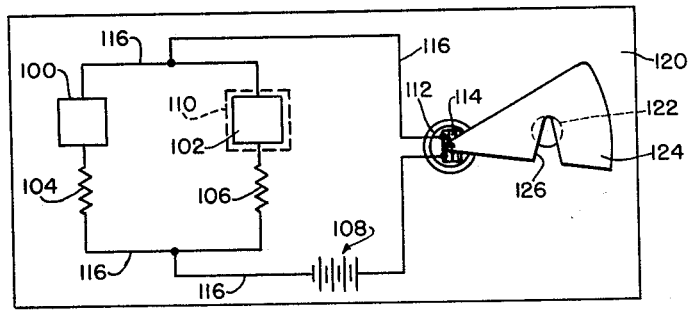
FIG. 6 is a schematic diagram of one embodiment of the invention as a photographic device.

Yet another embodiment of the present invention is shown schematically in FIG. 6 wherein a photoconductive transducing means, as for instance, that shown in FIGURE 1, comprises a portion of a combination which also includes exposure control means for a photographic device such as a camera, the output signal of the transducing means being therein employed for controlling exposure parameters of the camera. Referring now to FIG. 6, there are shown two transducing elements, such as photoconductive cells 100 and 102 which are disposed in parallel circuit relation to one another, each of said cells having associated therewith in series circuit relationship an electrically resistive element such as, respectively, resistor 104 and resistor 106. An electrical power source such as battery 108 is provided in series with the parallel network of the cells and resistors for energizing or driving said network. As may be seen, photocell 102 is provided (as shown in dotted lines) with a light-transmitting-and-absorbing element, such as filter 110, for reducing the light incident on cell 102 to a fraction of that incident upon cell 100. Disposed in series with both the parallel network and battery 108 is a current responsive means (shown schematically) such as galvanometer 112 having a movable coil 114, which is linearly responsive to the signal output of the parallel network. Suitable electrically conductive means indicated by the reference numeral 116, such as copper wire, are also included for providing the necessary connections for establishing the specified circuit relationships.

Means indicated generally at 120 are provided for supporting the various elements of this embodiment and for defining an exposure aperture 122. In the form shown, there are provided means, such as diaphragm blade 124, for controlling the light flux admissible through aperture 122. Blade 124 is mounted adjacent aperture 122 upon galvanometer 112 for movement with coil 114 and in a plane approximately perpendicular to the optic axis through aperture 122. Blade 124 is provided therein with an opening or tapered slot 126.

In operation it is apparent that the equilibrium position of coil 114 and consequently the position of diaphragm blade 124 is taken in accordance with current output as determined by the network of cells 100 and 102, resistors 104 and 106, and battery 108 respectively to the intensity of light proportionately incident upon the two cells. Blade 124 is preferably so disposed that when coil 114 is in the "no-current" or zero position, the largest portion of tapered slot 126 is aligned with opening 122, thereby allowing passage of the maximum light flux; when coil 114 is at the maximum current or full intensity position, diaphragm blade 124 is so disposed with the narrowest portion of slot 126 in alignment with aperture 122, thereby allowing passage of a minimum light flux.

In a sense the device shown and described in connection with FIG. 6 provides photographic exposure control through changes in circuit conductance, the conductance varying linearly with the logarithm of the light intensity over a wide range of such intensities.

The embodiments shown may also be tailored in accordance with certain desired uses. For instance, as the embodiment of FIGURE 1 is responsive to a wide range of light intensities, it is equally useful in photometers for both "indoor" and "outdoor" photography. However, the characteristic of "indoor" and "outdoor" light usually are quite different in terms of spectral composition, the former generally being comparatively deficient at the shorter wave lengths. Many photographic emulsions, particularly color-sensitive emulsions, are tailored to compensate for this deficiency. Similarly, in the embodiment of FIGURE 1, element 20 may be provided as a photoconductor which is sensitive to a spectral region so as to substantially match the spectral response of "daylight" color emulsions. Element 22, the attenuated photoconductor, may be provided in a material whose sensitivity is to a different spectral region and is thereby substantially matched to the spectral response of "tungsten" color emulsions. Alternatively, both elements may be sensitive to substantially the same spectral region and may then be provided with appropriate color filters to compensate for the difference between "outdoor" and "indoor" illumination, provided, of course, that the intensity attenuation of element 22 remains undisturbed. Some examples of typical shutter devices wherein the present invention may be similarly employed for determining photoexposure parameters such as shutter speed or relative diaphragm apertures may be found in, but are not limited by, U.S. Patent No. 2,800,844, issued July 30, 1957, to J. Durst et al.; copending U.S. application No. 711,331, filed January 27, 1958, by Lothrop, Purcell and Whittier; U.S. Patent No. 2,163,737, issued June 27, 1939, to F. B. A. Prinsen; and U.S. Patent No. 2,209,639, issued July 30, 1940, to H. F. Tönnies.

Figure 7:
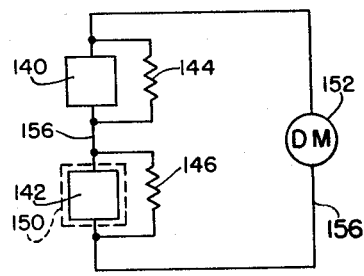
FIG. 7 is a schematic diagram of another embodiment of the invention as a photographic device.

Another embodiment of the present invention is shown schematically in FIG. 7 and employs a photoconducting transducer means in combination wtih exposure control means for a photographic device.

This combination includes two transducing elements such as photoconducting cells 140 and 142 having properties similar to elements 20 and 22 hereinbefore described. The cells are disposed in series circuit relation to one another, each of said cells having associated therewith in parallel circuit relationship an electrically resistive element of substantially constant ohmic value such as, respectively, resistor 144 and resistor 146. Attenuating means such as filter 150 (shown in broken lines) is provided in combination with photocell 142 for reducing the light incident on this cell to a fraction of that incident upon cell 140, thereby providing the cells with unequal effective responsivities. Disposed in series with the network of photocells and thereby closing the network is an electrodynamic device such as dynamotor 152. Suitable electrical connectors, such as copper wires identified by the numeral 156, are provided between the various elements to establish the relationships heretofore recited.

Dynamotor 152 preferably is characterized in utilizing a permanent magnet as a polarizing armature rotatable through an angle of less thn 180°, and is approximately linearly responsive in accordance with the resistance of its field coils. Such devices are generally known as permanent-magnetic torque-dynamotors.

Figure 8:
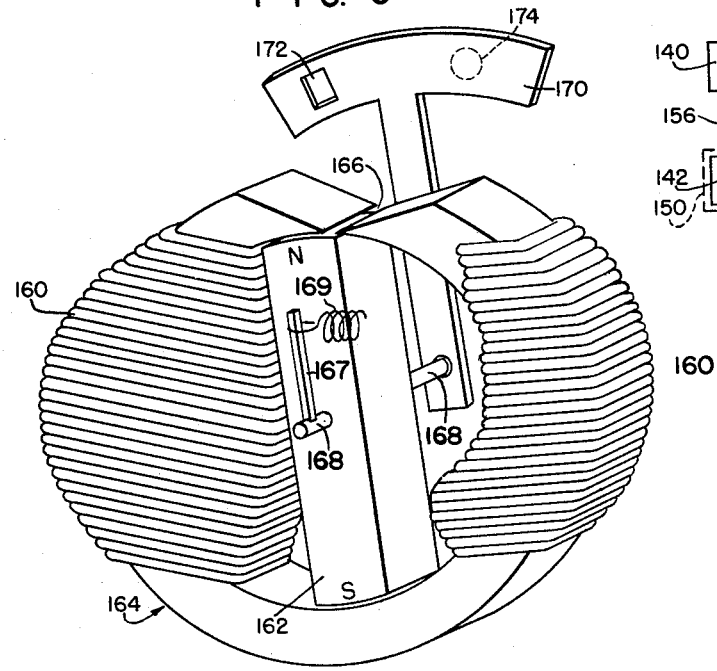
FIG. 8 is a detailed schematic diagram, partly broken away, of a portion of the embodiment shown in FIG. 6.

An example of such dynamotor is shown in detail in FIG. 8 and comprises a coil 160 which is wound about a generally cylindrical, magnetizable core such as ring 164, coil 160 being electrically connected with the series network of photocells shown in FIG. 7. Ring 164 has a slot 166 so disposed as to extend completely through the ring from the inner edge to the outer edge thereof, thus creating a discontinuity in the magnetic flux path through the configuration of the ring. Armature 162 preferably comprises a permanent magnet formed of an alloy such as "Alnico V," and is shaped as an elongated element having magnetic poles indicated by "N" and "S" disposed at its extremities. Armature 162 is mounted upon means, such as pivot 168, for pivotal movement inside ring 164 so that one of the magnetic poles is movable across slot 166 between a first position wherein the pole is disposed adjacent and to one side of the slot, and a second position wherein the pole is disposed adjacent and to the opposite side of slot 166.

Means are provided for moving the armature from the first to the second position and, in the form shown, comprise lever arm 167 attached to and movable with pivot 168, and resilient means such as spring 169 attached to lever arm 167. Means are preferably provided for releasably engaging lever arm 167 when spring 169 is under tension, thereby releasably retaining armature 162 in its first position.

Attached to pivot 168 and movable therewith is a means, such as shutter blade 170, for covering and uncovering an exposure aperture. Blade 170 is provided with an opening 172 therein, and is so disposed relative to an exposure aperture 174 that opening 172 is movable across the exposure aperture from one side thereof to the other simultaneously with movement of the armature from its first to its second position.

In operation, when exposed to a common actinic radiation signal, the electrical resistance of each of elements 140 and 142 will vary in value in accordance with the intensity of the radiation incident thereon. For the network shown in FIG. 7, a total resistance of one arm of the circuit (i.e., an arm being a combination of a photoconductor and its parallel resistance) may be given in the notation previously used herein approximately as follows:

$$R = \frac{B_1 K_1}{K_1 + B_1 I^{n_1}}$$

The total resistance of the network, excluding substantially constant ohmic values such as the resistance of the leads and of coil 160, may then be expressed approximately as follows:

$$R = \frac{B_1 K_1}{K_1 + B_1 I^{n_1}} + \frac{B_2 K_2}{K_2 + B_2 I^{n_2}}$$

Thus, it is seen that because the photoconductors are in series network with one another and are in parallel relation respectively with their associated, substantially constant resistors, the total resistance of the network varies substantially logarithmically with the intensity of radiation incident on the photocells. Analysis of the operation of this network will show that the range of intensities to which the circuit is responsive log-linearly is substantially greater than the range to which any of its components is responsive, the elements each contributing a different increment to the total range similarly as the embodiment heretofore described in connection with FIGURE 1. It is to be clearly understood that the "response" of the circuit of FIG. 7 is in terms of its resistance, while the "response" of the circuit of FIGURE 1 is in terms of conductance. By coupling the network to coil 160, the effective resistance of the coil will then also vary logarithmically with the intensity of the light.

Release of latch means so that lever arm 167 is moved under the bias of spring 169 rotates armature 162 from its first to its second position. The interaction between the moving pole of armature 162 and slot 166 induces a current in coil 160, the magnitude of the current being a linear function of the effective resistance of the coil. The magnetic field associated with this current, opposing the field of the permanent magnet, operates to retard the movement of the latter. Consequently, dynamotor 152 is characterized in that the speed of rotation of movement of the armature from its first position to its second position is, at least to a first approximation, a linear function of the effective resistance of coil 160. The exposure time provided by the speed of movement of opening 172 in the shutter blade across exposure aperture 174, in coupling relation with the movement of armature 162 is therefore determined in a substantially log-linear relation to the intensity of light incident upon the photocells over a very wide range of light values.

Although this last embodiment is preferred because it provides a light-responsive, "automatic" shutter mechanism which needs no electrical power source, in an alternative embodiment the circuit of FIG. 7 may include an electrical power source such as a battery and a means for switching the battery in and out of the circuit. In such an embodiment, there is no need for mechanical means such as lever arm 167 and spring 169 for moving the armature, inasmuch as dynamotor 152 is then operative purely as a motor. The speed of movement of the armature is in such device, at least in a first approximation, also linearly proportional to the logarithm of the intensity of the light incident upon the photocells.

An electrodynamic torque dynamotor such as used herein is shown and described in more detail in the copending application of David S. Grey, Serial No. 735,484, filed May 15, 1958, now Patent No. 3,056,341. Also a group of typical torque-motors, some of which are employable in the present combination, are shown in Dynamic Analysis and Control Laboratory Research Memorandum, No. R.M. 6387-5, published in 1954 by the Massachusetts Institute of Technology and entitled "A Study of Permanent Magnetic Torque Motors" by John F. Dunn, Jr.

The present application is a continuation-in-part of our copending application Serial No. 778,155, filed December 4, 1958, now abandoned.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A transducer device comprising, in combination, a plurality of photosensitive transducer portions disposed for exposure to a common source of light, said source of light having a predetermined range in intensity, each of said portions having an electrical resistance which varies approximately as an inverse power function of the intensity of light incident thereon, at least one of said portions having an effective responsivity unequal to the responsivities of the others of said portions, said portions being connected in parallel circuit relation to one another and in series circuit relation to an electrical power source for so energizing said portions as to produce an electrical output signal, and at least one electrically resistive element of substantially constant value, said portions being connected in series circuit relation with said resistive element for rendering said output signals as a substantially logarithmic function of the intensity of said light throughout said predetermined range, said electrical output signal varying between a minimum and a maximum value as the said intensity of said source of light varies through said predetermined range.

2. A device sensitive to radiation, said device comprising, in combination, a plurality of photoconductive elements disposed for exposure to a common source of radiation, said radiation having a predetermined range in intensity, each of said elements having an electrical resistance whose value varies approximately as an inverse power function of the intensity of radiation incident thereon, at least one radiation filter so disposed with respect to at least one of said photoconductive elements as to transmit, to said one element, only an intensity of radiation which bears a predetermined fractional relation to the intensity of radiation incident upon the others of said elements, at least one electrically resistive member, said elements and member being disposed in a network wherein each of said elements is in parallel circuit relation to one another and in series circuit relation with said electrically resistive member, said network producing an output signal which varies between a minimum and a maximum value as the intensity of said source of radiation varies through said predetermined range.

3. A device sensitive to radiation as defined in claim 2 wherein said electrical resistance of said photoconductive elements varies as a function of radiation lying within a range from infrared to ultraviolet.

4. A device sensitive to radiation as defined in claim 3 wherein each of said photoconductive elements are in ohmic contact with one another.

5. A device sensitive to radiation, said device comprising, in combination, a photoconductive element having a plurality of contiguous photosensitive portions disposed for exposure to a common source of radiation, said source of radiation having a predetermined range in intensity, a radiation transmitting and electrically conductive common electrode in ohmic contact with said portions, a second electrode having an electrical resistance and cooperating with said common electrode for connecting said portions by ohmic contact in parallel circuit relation to one another, said second electrode being in series circuit relation with said portions, each of said portions having an electrical resistance which is an inverse power function of the intensity of radiation incident thereon, a radiation filter means so disposed with respect to at least one of said portions as to limit the intensity of radiation incident upon said one of said portions to a predetermined fraction of the intensity of radiation incident upon the others of said portions, and an electrical power source connected with one of said electrodes for energizing said device to derive therefrom an electrical output signal, said signal varying between a minimum and a maximum value as the intensity of said source of radiation varies through said predetermined range.

6. A radiation-sensitive device as defined in claim 2 including a means responsive to changes in the conductance of and electrically connected to said network, and means for switching said elements in and out of said network.

7. A radiation-sensitive device as defined in claim 2 including an ammeter connected with said network, a resistor for shunting said ammeter, and a switch for switching said resistor in and out of circuit with said ammeter, each of said elements having associated therewith a corresponding switching means for selectively switching said elements in and out of said network.

8. A transducing device comprising, in combination, at least two photosensitive transducer portions disposed for exposure to a common source of light to which said portions are responsive for providing a total output signal, said source of light having a predetermined range in intensity, each of said portions having an electrical resistance which varies approximately as an inverse power function of the intensity of light incident thereon and having unequal effective responsivities, each of said portions being connected in series circuit relation to one another, and at least two electrically resistive elements each of which is connected in parallel circuit relation with a respective one of said portions, said output signal varying between a minimum and a maximum value as the intensity of said source of light varies through said predetermined range.

9. A transducing device comprising, in combination, at least two photosensitive transducer portions disposed for exposure to a common source of light to which said portions are responsive for providing a total output signal, said source of light having a predetermined range in intensity, each of said portions having an electrical resistance which varies approximately as an inverse power function of the intensity of light incident thereon. means for so absorbing and transmitting portions of light incident upon one of said transducer portions as to render the effective responsivities of said transducer portions unequal, at least two electrically resistive elements of substantially constant ohmic value, each of said resistive elements being connected with a respective transducer portion in parallel circuit relation, and means for electrically connecting each of said transducer portions in series circuit relation to one another, said output signal varying between a minimum and a maximum value as the intensity of said source of light varies through said predetermined range.

10. A transducer device comprising, in combination:
(a) an electrical network constructed and arranged to have a variable current flowing therein;
(b) a pair of photosensitive transducer portions disposed for exposure to a common source of light, each of said portions having an electrical property whose magnitude is functionally related to the level of brightness of said source;
(c) means for so connecting said portions in said network that the level of current flowing therein is automatically controlled by the electrical properties of said portions and varies in magnitude in accordance with changes in the brightness level of said source of light over a predetermined range of levels of brightness;
(d) and means operatively associated with said portions for causing variations in the magnitude of said current to depend primarily on the magnitude of the electrical property of one of said portions over one part of said predetermined range of levels of brightness and on the magnitude of the electrical property of the other of said portions over another part of said predetermined range of levels of brightness.

11. A transducer device as defined in claim 10 wherein said last-named means includes a light attenuator interposed between one of said transducer portions and said source of light.

12. A transducer device as defined in claim 10 wherein said last-named means and the electrical properties of said transducer portions are such that said current varies as a substantially linear function of the logarithm of the brightness level of said source of light over said predetermined range of levels of brightness.

13. A transducer device as defined in claim 12 wherein said network has connected therein an electromagnetic device having a deflectable portion and the deflection of said deflectable portion is controlled by and is proportional to the magnitude of said current.

14. A transducer device as defined in claim 13 wherein said pair of transducer portions comprises a pair of photoconductive elements.

15. A transducer device as defined in claim 14 wherein said electrical network includes means for selectively switching said transducer portions in and out of said network.

References Cited by the Examiner
UNITED STATES PATENTS

| | | | |
|---|---|---|---|
| 2,032,633 | 3/36 | Riszdorfer. | |
| 2,186,613 | 1/40 | Mihalyi. | |
| 2,188,820 | 1/40 | Riszdorfer | 95—53 |
| 2,226,602 | 12/40 | Frost | 95—53 |
| 2,261,532 | 11/41 | Tonnies. | |
| 2,438,825 | 3/48 | Roth | 250—208 |
| 2,482,980 | 9/49 | Kallmann | 250—210 X |
| 2,524,303 | 10/50 | Maury. | |
| 2,586,746 | 2/52 | Tyler. | |
| 2,593,616 | 4/52 | Schroeder | 250—208 |
| 2,654,845 | 10/53 | Presenz | 250—218 X |
| 2,742,550 | 4/56 | Jenness | 250—211 X |
| 2,766,654 | 10/56 | Stimson et al. | 250—237 X |
| 2,917,969 | 12/59 | Stimm | 250—224 X |
| 2,939,361 | 6/60 | Hock | 250—218 X |
| 3,028,499 | 4/62 | Farrall | 250—209 |

RALPH G. NILSON, *Primary Examiner.*

ELLIS E. FULLER, DELBERT B. LOWE, *Examiners.*